US012765554B2

(12) United States Patent
Oka et al.

(10) Patent No.: US 12,765,554 B2
(45) Date of Patent: Oct. 20, 2026

(54) SOLID PESTICIDAL FORMULATION

(71) Applicant: SUMITOMO CHEMICAL COMPANY, LIMITED, Chuo-ku (JP)

(72) Inventors: Atsushi Oka, Takarazuka (JP); Ai Rusu, Takarazuka (JP)

(73) Assignee: SUMITOMO CHEMICAL COMPANY, LIMITED, Chuo-ku (JP)

( * ) Notice: Subject to any disclaimer, the term of this patent is extended or adjusted under 35 U.S.C. 154(b) by 577 days.

(21) Appl. No.: 18/254,340

(22) PCT Filed: Nov. 30, 2021

(86) PCT No.: PCT/JP2021/043749
§ 371 (c)(1),
(2) Date: May 24, 2023

(87) PCT Pub. No.: WO2022/118815
PCT Pub. Date: Jun. 9, 2022

(65) Prior Publication Data

US 2023/0404079 A1 Dec. 21, 2023

(30) Foreign Application Priority Data

Dec. 1, 2020 (JP) ................................ 2020-199851

(51) Int. Cl.
*A01N 43/54* (2006.01)
*A01N 25/08* (2006.01)

(52) U.S. Cl.
CPC ............. *A01N 43/54* (2013.01); *A01N 25/08* (2013.01)

(58) Field of Classification Search
CPC ................................ A01N 43/54; A01N 25/08
USPC .......................................................... 514/274
See application file for complete search history.

(56) References Cited

U.S. PATENT DOCUMENTS

| | | | | |
|---|---|---|---|---|
| 6,537,948 | B1 | 3/2003 | Tohyama et al. | |
| 2004/0254077 | A1 | 12/2004 | Tohyama et al. | |
| 2011/0177946 | A1* | 7/2011 | Hacker | A01N 43/66 504/134 |

FOREIGN PATENT DOCUMENTS

| | | | | |
|---|---|---|---|---|
| CN | 102578081 | A * | 7/2012 | |
| JP | 2002-155061 | A | 5/2002 | |
| JP | 2004-35476 | A | 2/2004 | |
| JP | 2020-50667 | A | 4/2020 | |
| WO | WO 03/014109 | A1 | 2/2003 | |
| WO | WO 2018/178039 | A1 | 10/2018 | |
| WO | WO-2019030098 | A1 * | 2/2019 | A01N 41/06 |

OTHER PUBLICATIONS

Huang et al. CN 102578081A English machine translation retrieved from Google Patents on Sep. 30, 2025. (Year: 2025).*
Mulqueen, P. J. (1998) Recent Developments on Safer Formulations of Agrochemicals. In Chemistry and Technology of Agrochemical Formulations, Ed. D. A. Knowles, Springer (Year: 1998).*
International Search Report Issued Feb. 8, 2022, in PCT/JP2021/043749, filed on Nov. 30, 2021, 2 pages.

* cited by examiner

*Primary Examiner* — Kahsay Habte
(74) *Attorney, Agent, or Firm* — Oblon, McClelland, Maier & Neustadt, L.L.P.

(57) ABSTRACT

A solid pesticidal composition contains a compound represented by the following formula (I), an organic solvent, a surfactant and a solid carrier. The organic solvent is a solvent capable of dissolving 1 g or more of the compound represented by the following formula (I) per 100 g of the organic solvent at a temperature of 0° C. The amount of the surfactant dissolved in 100 g of the organic solvent at a temperature of 25° C. is 1 g or more.

(I)

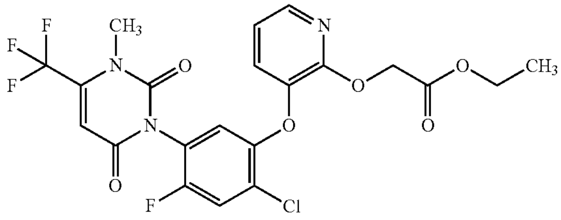

12 Claims, No Drawings

SOLID PESTICIDAL FORMULATION

CROSS-REFERENCE TO RELATED APPLICATIONS

The present application is a 35 U.S.C. § 371 national stage patent application of International patent application PCT/JP2021/043749, filed on Nov. 30, 2021, which is based on and claims the benefits of priority to Japanese Application No. 2020-199851, filed on Dec. 1, 2020.

TECHNICAL FIELD

The present invention relates to a solid pesticidal formulation.

BACKGROUND ART

Methods of dissolving, emulsifying or dispersing pesticidal formulations in water to prepare spray liquids, and spraying the spray liquids to plants or their growing environments are known as methods for applying pesticidal formulations. The solid pesticidal formulations, for example, water dispersible granules and wettable powders, to be applied by the methods are required to have favorable dispersibility when mixed with water.

A compound represented by the following formula (I), which is an active ingredient for herbicides, is known as a pesticidal active ingredient (see e.g., U.S. Pat. No. 6,537,948 (PTL 1) and WO 2003/014109 (PTL 2)).

(I)

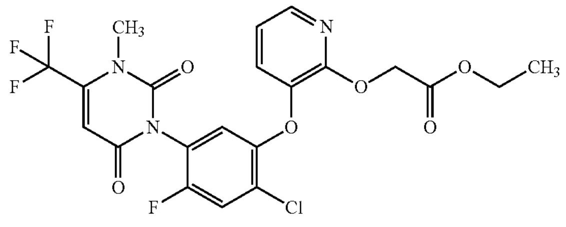

CITATION LIST

Patent Literature

PTL 1: U.S. Pat. No. 6,537,948
PTL 2: WO 2003/014109
PTL 3: Japanese Patent Laying-Open No. 2004-35476

SUMMARY OF INVENTION

Technical Problem

An object of the present invention is to provide a solid pesticidal formulation having favorable dispersibility in water when mixed with water.

Solution to Problem

The present invention provides the following solid pesticidal composition.

[1] A solid pesticidal composition comprising a compound represented by the following formula (I), an organic solvent, a surfactant, and a solid carrier, wherein the organic solvent is a solvent capable of dissolving 1 g or more of the compound represented by the following formula (I) per 100 g of the organic solvent at a temperature of 0° C., and an amount of the surfactant dissolved in 100 g of the organic solvent at a temperature of 25° C. is 1 g or more:

(I)

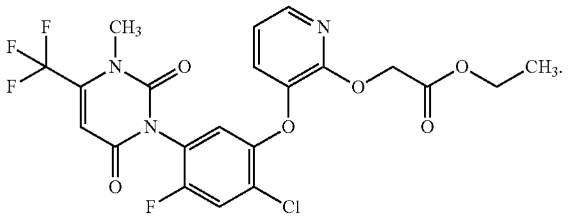

[2] The solid pesticidal composition according to [1], wherein a content of the compound represented by the formula (I) is 0.01 wt % or more and 15 wt % or less, a content of the organic solvent is 1 wt % or more and 40 wt % or less, and a content of the surfactant is 1 wt % or more and 20 wt % or less.

[3] The solid pesticidal composition according to [1] or [2], wherein the compound represented by the formula (I) is dissolved in the organic solvent.

[4] The solid pesticidal composition according to any of [1] to [3], wherein the organic solvent comprises one or more solvents selected from the following group (A): group (A): the group consisting of butyl benzoate, benzyl acetate, dimethyl 2-methylglutarate, tributyl acetylcitrate, diisobutyl adipate, aromatic hydrocarbons, and N,N-dimethyl fatty acid amides.

[5] The solid pesticidal composition according to any of [1] to [4], wherein the solid carrier comprises one or more carriers selected from the following group (B): group (B): the group consisting of diatomaceous earth, mica, talc, clay, calcium carbonate, bentonite, amorphous silica, crystalline cellulose, and lactose.

Advantageous Effects of Invention

According to the present invention, it is made possible to provide a solid pesticidal formulation having favorable dispersibility in water when mixed with water.

DESCRIPTION OF EMBODIMENTS

A solid pesticidal composition according to the present invention (hereinafter, also called "composition of the present invention") contains a compound represented by the following formula (I) (hereinafter, also called "compound (I)"), an organic solvent, a surfactant, and a solid carrier. The organic solvent is a solvent capable of dissolving 1 g or more of the compound (I) per 100 g of the organic solvent at a temperature of 0° C. (hereinafter, this organic solvent is also called "present organic solvent"). The amount of the surfactant dissolved in 100 g of the present organic solvent at a temperature of 25° C. is 1 g or more (hereinafter, this surfactant is also called "present surfactant").

The composition of the present invention contains a compound (I). The compound (I) is a known compound and has an excellent herbicidal efficacy. The compound (I) can be synthesized by, for example, a method described in PTLs 1 and 2.

(I)

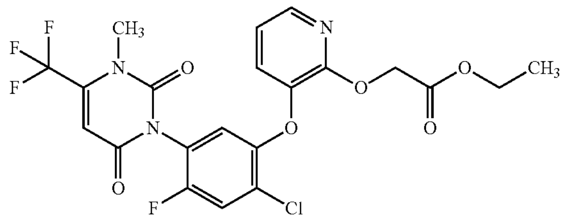

The compound (I) is a solid at a temperature of 25° C. Although the compound (I) in the composition of the present invention may be present in a solid state, it is preferable to be present in a state dissolved in the present organic solvent.

The content of the compound (I) in the composition of the present invention is preferably 0.01 wt % or more, more preferably 0.03 wt % or more, and may be 0.05 wt % or more, may be 0.1 wt % or more, and may be 0.5 wt % or more. The content of the compound (I) in the composition of the present invention is preferably 30 wt % or less, and may be 20 wt % or less. It is more preferably 15 wt % or less and may be 10 wt % or less, may be 5 wt % or less, may be 3 wt % or less, and may be 2.5 wt % or less.

The composition of the present invention contains one, two, or more present organic solvents. Examples of the present organic solvent include: esters such as methyl salicylate, methyl oleate, ethyl acetate, octyl acetate, benzyl acetate, methyl benzoate, ethyl benzoate, butyl benzoate, dimethyl 2-methylglutarate, diisobutyl adipate, didecyl adipate, tributyl acetylcitrate, allyl acetoacetate, 2-ethylhexyl lactate, and butyl propionate;

ethers such as dimethyl isosorbide;

ketones such as 2-heptanone;

alcohols such as methanol;

amides such as N,N-dimethyloctanamide, N,N-dimethyldecanamide, N,N-dimethyl-9-decenamide, and fatty acid dimethylamides; and aromatic hydrocarbons such as toluene, xylene, alkylbenzenes (e.g., ethylbenzene, dialkylbenzene, and trialkylbenzene), alkylnaphthalenes (e.g., methylnaphthalene), and 1-phenyl-1-ethylphenylethane, butylbiphenyl, and mixtures thereof.

The amount of the compound (I) dissoluble per 100 g of the present organic solvent at a temperature of 0° C. is 1 g or more. A solvent capable of dissolving the compound (I) in an amount of 3 g or more is preferred, a solvent capable of dissolving the compound (I) in an amount of 5 g or more may be used, and a solvent capable of dissolving the compound (I) in an amount of 10 g or more may be used. Furthermore, it is preferable that the vapor pressure of the present organic solvent at a temperature of 20° C. be $1.0\times10^{-2}$ mmHg or less. The vapor pressure of the present organic solvent at a temperature of 20° C. is $1.0\times10^{-3}$ mmHg or less, $1.0\times10^{-4}$ mmHg or less or $1.0\times10^{-5}$ mmHg or less. Among the examples of the present organic solvent described above, one or more solvents selected from the group (A) consisting of butyl benzoate, benzyl acetate, dimethyl 2-methylglutarate, aromatic hydrocarbons, tributyl acetylcitrate, diisobutyl adipate, and N,N-dimethyl fatty acid amides are preferable, and one or more solvents selected from the group consisting of tributyl acetylcitrate, diisobutyl adipate, and N,N-dimethyl fatty acid amides are more preferable. The solvent selected from the group (A) described above is used as the present organic solvent, whereby favorable dispersibility in water is easily obtained when the composition of the present invention is mixed with water.

The content of the present organic solvent in the composition of the present invention is preferably 0.1 wt % or more, more preferably 1 wt % or more. It may be 5 wt % or more and may be 10 wt % or more. The content of the present organic solvent in the composition of the present invention is preferably 60 wt % or less and may be 50 wt % or less. It is more preferably 40 wt % or less and may be 30 wt % or less. When the composition of the present invention contains two or more present organic solvents, the content of the present organic solvent refers to the total content thereof.

The content of the solvent selected from the group (A) in the content of the present organic solvent in the composition of the present invention is preferably 60 wt % or more, more preferably 70 wt % or more, and may be 80 wt % or more, may be 90 wt % or more, and may be 100 wt %.

The composition of the present invention contains one, two, or more present surfactants. The present surfactant is used, whereby favorable dispersibility in water is easily obtained when the composition of the present invention is mixed with water.

Examples of the present surfactant include nonionic surfactants, anionic surfactants, and mixtures thereof.

Examples of the nonionic surfactant include polyoxyethylene alkyl ethers, polyoxypropylene alkyl ethers, polyoxyethylene polyoxypropylene alkyl ethers, polyoxyalkylene styryl phenyl ethers such as polyoxyethylene distyryl phenyl ether and polyoxyethylene tristyryl phenyl ether, polyoxyalkylene vegetable oils such as polyoxyethylene castor oil, sucrose fatty acid esters, sorbitan fatty acid esters, polyoxyethylene sorbitan fatty acid esters, glycerin fatty acid esters, polyoxyethylene fatty acid esters, polyoxyethylene alkylamines, alkylalkanolamides, polyoxyethylene polyoxypropylene block copolymers, and alkylpolyglycosides. Examples of the anionic surfactant include alkylbenzenesulfonic acid metal salts.

Preferable examples of the present surfactant include polyoxyalkylene vegetable oils, polyoxyalkylene styryl phenyl ether, and polyoxyethylene polyoxypropylene block copolymers. Among them, polyoxyethylene castor oil, polyoxyethylene tristyryl phenyl ether, and a polyoxyethylene polyoxypropylene block copolymer are more preferable.

The content of the present surfactant in the composition of the present invention is preferably 0.1 wt % or more, more preferably 1 wt % or more, and may be 3 wt % or more, may be 5 wt % or more, and may be 10 wt % or more. The content of the present surfactant in the composition of the present invention is preferably 50 wt % or less and may be 40 wt % or less. It is more preferably 20 wt % or less and may be 15 wt % or less. When the composition of the present invention contains two or more present surfactants, the content of the present surfactant refers to the total content thereof.

The present surfactant is dissolved in the present organic solvent, whereby favorable dispersibility in water is easily obtained when the composition of the present invention is mixed with water.

The composition of the present invention contains one, two, or more solid carriers. The solid carrier may be a water-insoluble solid carrier or may be a water-soluble solid carrier. The water-soluble solid carrier herein refers to a solid carrier having a water solubility of 1 g/L or more at a temperature of 20° C., and the water-insoluble solid carrier refers to a solid carrier having a water solubility of less than 1 g/L at a temperature of 20° C. Examples of the water-insoluble solid carrier include fine powders of mineral substances such as diatomaceous earth, mica, talc, clay, bentonite, dolomite, Japanese acid clay, pyrophyllite, calcite, calcium carbonate, amorphous silica, calcium silicate, calcium sulfate, magnesium sulfate, and magnesium oxide, and fine powders of organic substances such as crystalline cellulose and walnut shell flour. Examples of the water-soluble solid carrier include saccharides such as glucose, sucrose, fructose, and lactose, water-soluble polymer powders such as methylcellulose, carboxymethylcellulose sodium, and alginic acid propylene glycol ester, water-soluble organic fine powders such as urea, and fine powders of inorganic salts such as ammonium sulfate salts.

The solid carrier is preferably one or more carriers selected from the group (B) consisting of diatomaceous earth, mica, talc, clay, calcium carbonate, bentonite, amorphous silica, crystalline cellulose, and lactose, more preferably one or more carriers selected from the group consisting of diatomaceous earth, mica, talc, clay, and crystalline cellulose.

The carrier selected from the group (B) described above is used as the solid carrier, whereby favorable dispersibility in water is easily obtained when the composition of the present invention is mixed with water.

The content of the solid carrier in the composition of the present invention is usually 5 wt % or more, preferably 10 wt % or more, more preferably 20 wt % or more, and may be 50 wt % or more. The content of the solid carrier in the composition of the present invention is usually 95 wt % or less, preferably 90 wt % or less, and may be 85 wt % or less and may be 80 wt % or less. When the composition of the present invention contains two or more solid carriers, the content of the solid carrier refers to the total content thereof.

The content of the carrier selected from the group (B) in the content of the solid carrier in the composition of the present invention is preferably 45 wt % or more, more preferably 50 wt % or more, and may be 70 wt % or more, may be 80 wt % or more, and may be 100 wt %. It may be 90 wt % or less, may be 80 wt % or less, and may be 70 wt % or less.

The composition of the present invention may optionally contain other optional formulation auxiliary ingredients. Examples of other formulation auxiliary ingredients include surfactants other than the present surfactant described above, binders, antifoaming agents, colorants, and fragrances. However, the composition of the present invention usually contains 70 wt % or more, preferably 75 wt % or more, in total of the compound (I), the present organic solvent, the present surfactant, and the solid carrier.

Examples of the binders include sodium alginate, polyvinyl alcohol, gum arabic, dextrin, and starch. The content of the binder in the composition of the present invention is usually 0.1 wt % or more and 5 wt % or less.

Examples of the antifoaming agent include silicone-based antifoaming agents. The content of the antifoaming agent in the composition of the present invention is usually 0.01 wt % or more and 1 wt % or less.

The composition of the present invention may further contain one or more additional herbicidal active compounds other than the compound (I), a solvent other than the present organic solvent, and/or a surfactant other than the present surfactant.

Examples of other herbicidal active compounds other than the compound (I) include the following:

2,3,6-TBA (2,3,6-trichlorobenzoic acid), 2,3,6-TBA-dimethylammonium, 2,3,6-TBA-lithium, 2,3,6-TBA-potassium, 2,3,6-TBA-sodium, 2,4-D (2,4-dichlorophenoxyacetic acid), 2,4-D choline salt, 2,4-D-biproamine, 2,4-D-doboxyl, 2,4-D-2-ethylhexyl, 2,4-D-3-butoxypropyl, 2,4-D-ammonium, 2,4-D-butotyl, 2,4-D-butyl, 2,4-D-diethylammonium, 2,4-D-dimethylammonium, 2,4-D-diolamine, 2,4-D-dodecylammonium, 2,4-D-ethyl, 2,4-D-heptylammonium, 2,4-D-isobutyl, 2,4-D-isoctyl, 2,4-D-isopropyl, 2,4-D-isopropylammonium, 2,4-D-lithium, 2,4-D-meptyl, 2,4-D-methyl, 2,4-D-octyl, 2,4-D-pentyl, 2,4-D-propyl, 2,4-D-sodium, 2,4-D-tefuryl, 2,4-D-tetradecylammonium, 2,4-D-triethylammonium, 2,4-D-tris(2-hydroxypropyl)ammonium, 2,4-D-trolamine, 2,4-DB (2,4-dichlorophenoxybutyric acid), 2,4-DB choline salt, 2,4-DB-biproamine, 2,4-DB-butyl, 2,4-DB-dimethylammonium, 2,4-DB-isoctyl, 2,4-DB-potassium, 2,4-DB-sodium, acetochlor, acifluorfen, acifluorfen-sodium, aclonifen, ACN (2-amino-3-chloronaphthalene-1,4-dione), alachlor, allidochlor, alloxydim, ametryn, amicarbazone, amidosulfuron, aminocyclopyrachlor, aminocyclopyrachlor-methyl, aminocyclopyrachlor-potassium, aminopyralid, aminopyralid choline salt, aminopyralid-potassium, aminopyralid-tripromine, amiprophos-methyl, amitrole, anilofos, asulam, atrazine, azafenidin, azimsulfuron, beflubutamid, benazolin-ethyl, bencarbazone, benfluralin, benfuresate, bensulfuron, bensulfuron-methyl, bensulide, bentazon, benthiocarb, benzfendizone, benzobicyclon, benzofenap, benzthiazuron, bialaphos, bicyclopyrone, bifenox, bispyribac, bispyribac-sodium, bixlozone, bromacil, bromobutide, bromofenoxim, bromoxynil, bromoxynil-octanoate, butachlor, butafenacil, butamifos, butralin, butroxydim, butylate, cafenstrole, carbetamide, carfentrazone, carfentrazone-ethyl, chlomethoxyfen, chloramben, chloridazon, chlorimuron, chlorimuron-ethyl, chlorobromuron, chlorotoluron, chloroxuron, chlorpropham, chlorsulfuron, chlorthal-dimethyl, chlorthiamid, cinidon, cinidon-ethyl, cinmethylin, cinosulfuron, clethodim, clodinafop, clodinafop-propargyl, clomazone, clomeprop, clopyralid, clopyralid choline salt, clopyralid-methyl, clopyralid-olamine, clopyralid-potassium, clopyralid-tris(2-hydroxypropyl)ammonium, cloransulam, cloransulam-methyl, cumyluron, cyanazine, cyclopyranil, cycloate, cyclopyrimorate, cyclosulfamuron, cycloxydim, cyhalofop, cyhalofop-butyl, daimuron, dalapon, dazomet, desmedipham, desmetryn, diallate, dicamba, dicamba choline salt, dicamba-biproamine, dicamba-trolamine, dicamba-diglycolamine, dicamba-dimethylammonium, dicamba-diolamine, dicamba-isopropylammonium, dicamba-methyl, dicamba-olamine, dicamba-potassium, dicamba-sodium, dichlobenil, dichlorprop, dichlorprop choline salt, dichlorprop-biproamine, dichlorprop-etexyl, dichlorprop-butotyl, dichlorprop-dimethylammonium, dichlorprop-ethylammonium, dichlorprop-isoctyl, dichlorprop-methyl, dichlorprop-P, dichlorprop-P choline salt, dichlorprop-P-biproamine, dichlorprop-P-etexyl, dichlorprop-P-dimethylammonium, dichlorprop-potassium, dichlorprop-sodium, diclofop, diclofop-methyl, diclosulam, difenoxuron, difenzoquat, difenzoquat metilsulfate, diflufenican, diflufenzopyr, diflufenzopyr-sodium, dimefuron, dimepiperate, dimethachlor, dimethametryn, dimethenamid, dimethenamid-P, dimepiperate, dinitramine, dinoseb, dinoterb, diphenamid, diquat, diquat-dibromide, DSMA (disodium methylarsonate), dithiopyr, diuron, DNOC (2-methyl-4,6-dinitrophenol), esprocarb, ethalfluralin, ethametsulfuron, ethametsulfuron-methyl, ethidimuron, ethofumesate, ethoxyfen-ethyl, ethoxysulfuron, etobenzanid, fenoxaprop, fenoxaprop-ethyl, fenoxaprop-P, fenoxaprop-P-ethyl, fenoxasulfone, fenquinotrione, fentrazamide, fenuron, flamprop-M, flazasulfuron, florasulam, florpyrauxifen, florpyrauxifen-benzyl, fluazifop, fluazifop-butyl, fluazifop-P, fluazifop-P-butyl, fluazolate, flucarbazone, flucarbazone-sodium, flucetosulfuron, flufenacet, flufenpyr, flufenpyr-ethyl, flumetsulam, flumiclorac, flumiclorac-pentyl, flumioxazin, fluometuron, fluoroglycofen-ethyl, flupoxam, flupropanate, flupyrsulfuron, flupyrsulfuron-methyl-sodium, flurenol, fluridone, flurochloridone, fluroxypyr, fluroxypyr-butometyl, fluroxypyr-meptyl, flurtamone, fluthiacet, fluthiacet-methyl, fomesafen, fomesafen-sodium, foramsulfuron, fosamine, glufosinate, glufosinate-ammonium, glufosinate-P, glufosinate-P-ammonium, glufosinate-P-sodium, glyphosate, glyphosate choline salt, glyphosate-isopropylammonium, glyphosate-biproamine, glyphosate-ammonium, glyphosate-diammonium, glyphosate-potassium, glyphosate-sodium, glyphosate-trimesium, halauxifen, halauxifen-methyl, halosafen, halosulfuron, halosulfuron-methyl, haloxyfop, haloxyfop-etotyl, haloxyfop-methyl, haloxyfop-P, haloxyfop-P-etotyl, haloxyfop-P-methyl, hexazinone, imazamethabenz, imazamethabenz-methyl, imazamox, imazamox-ammonium, imazapic, imazapic-ammonium, imazapyr, imazapyr-isopropylammonium, imazaquin, imazaquin-ammonium, imazethapyr, imazethapyr-ammonium, imazosulfuron, indanofan, indaziflam, iodosulfuron, iodosulfuron-methyl-sodium, iofensulfuron, iofensulfuron-sodium, ioxynil, ioxynil-octanoate, ipfencarbazone, isoproturon, isouron, isoxaben, isoxachlortole, isoxaflutole, lactofen, lenacil, linuron, maleic hydrazide, MCPA (2-(4-chloro-2-methylphenoxy)acetic acid), MCPA choline salt, MCPA-biproamine, MCPA-etexyl, MCPA-butotyl, MCPA-butyl, MCPA-dimethylammonium, MCPA-diolamine, MCPA-ethyl, MCPA-isobutyl, MCPA-isoctyl, MCPA-isopropyl, MCPA-methyl, MCPA-olamine, MCPA-sodium, MCPA-trolamine, MCPB (4-(4-chloro-2-methylphenoxy)butanoic acid), MCPB choline salt, MCPB-biproamine, MCPB-ethyl, MCPB-methyl, MCPB-sodium, mecoprop, mecoprop choline salt, mecoprop-biproamine, mecoprop-2-ethylhexyl, mecoprop-dimethylammonium, mecoprop-diolamine, mecoprop-ethadyl, mecoprop-isoctyl, mecoprop-methyl, mecoprop-potassium, mecoprop-sodium, mecoprop-trolamine, mecoprop-P, mecoprop-P choline salt, mecoprop-P-2-ethylhexyl, mecoprop-P-dimethylammonium, mecoprop-P-isobutyl, mecoprop-P-potassium, mefenacet, mesosulfuron, mesosulfuron-methyl, mesotrione, metam, metamifop, metamitron, metazachlor, metazosulfuron, methabenzthiazuron, methiozolin, methyldymron, metobromuron, metolachlor, metosulam, metoxuron, metribuzin, metsulfuron, metsulfuron-methyl, molinate, monolinuron, naproanilide, napropamide, napropamide-M, naptalam, neburon, nicosulfuron, norflurazon, oleic acid, orbencarb, orthosulfamuron, oryzalin, oxadiargyl, oxadiazon, oxasulfuron, oxaziclomefone, oxyfluorfen, paraquat, paraquat-dichloride, pebulate, pelargonic acid, pendimethalin, penoxsulam, pentanochlor, pentoxazone, pethoxamid, phenisopham, phenmedipham, picloram, picolinafen, pinoxaden, piperophos, pretilachlor, primisulfuron, primisulfuron-methyl, prodiamine, profluazol, profoxydim, prometon, prometryn, propachlor, propanil, propaquizafop, propazine, propham, propisochlor, propoxycarbazone, propoxycarbazone-sodium, propyrisulfuron, propyzamide, prosulfocarb, prosulfuron, pyraclonil, pyraflufen-ethyl, pyrasulfotole, pyrazolynate, pyrazosulfuron, pyrazosulfuron-ethyl, pyrazoxyfen, pyribenzoxim, pyributicarb, pyridafol, pyridate, ppiftalid, pyriminobac, pyriminobac-methyl, pyrimisulfan, pyrithiobac, pyrithiobac-sodium, pyroxasulfone, pyroxsulam, quinclorac, quinmerac, quizalofop, quizalofop-ethyl, quizalofop-tefuryl, quizalofop-P, quizalofop-P-ethyl, quizalofop-P-tefuryl, rimsulfuron, saflufenacil, sethoxydim, EPTC (S-ethyl N,N-dipropylcarbamothioate), siduron, simazine, simetryn, S-metolachlor, MSMA (sodium hydrogen methylarsonate), sulcotrione, sulfentrazone, sulfometuron, sulfometuron-methyl, sulfosulfuron, swep, TCA (2,2,2-trichloroacetic acid), TCA-ammonium, TCA-calcium, TCA-ethadyl, TCA-magnesium, TCA-sodium, tebutam, tebuthiuron, tefuryltrione, tembotrione, tepraloxydim, terbacil, terbumeton, terbuthylazine, terbutryn, tetflupyrolimet, thaxtomin A, thenylchlor, thiazopyr, thidiazimin, thiencarbazone, thiencarbazone-methyl, thifensulfuron, thifensulfuron-methyl, tiafenacil, tiocarbazil, tolpyralate, topramezone, tralkoxydim, triafamone, tri-allate, triasulfuron, triaziflam, tribenuron, tribenuron-methyl, triclopyr, triclopyr-butotyl, triclopyr-ethyl, triclopyr-triethylammonium, tridiphane, trietazine, trifloxysulfuron, trifloxysulfuron-sodium, trifludimoxazin, trifluralin, triflusulfuron, triflusulfuron-methyl, tritosulfuron, vernolate, 4-(4-fluorophenyl)-6-[(2-hydroxy-6-oxo-1-cyclohexen-1-ypcarbonyl]-2-methyl-1,2,4-triazine-3,5(2H,4H)-dione, 2-chloro-N-(1-methyl-1H-tetrazol-5-yl)-3-(methylthio)-4-(trifluoromethyl)benzamide, 2-methyl-N-(5-methyl-1,3,4-oxadiazol-2-yl)-3-(methanesulfonyl)-4-(trifluoromethyl)benzamide, 4-amino-3-chloro-5-fluoro-6-(7-fluoro-1H-indol-6-yl)pyridine-2-carboxylic acid, 4-amino-3-chloro-5-fluoro-6-(7-fluoro-1H-indol-6-yppyridine-2-carboxylic acid cyanomethyl ester, (2R,4R)-4-({[(5S)-3-(3,5-difluorophenyl)-5-vinyl-4,5-dihydroisoxazol-5-yl]carbonyl}amino)tetrahydrofuran-2-carboxylic acid methyl ester, (2S,4S)-4-({[(5R)-3-(3,5-difluorophenyl)-5-vinyl-4,5-dihydroisoxazol-5-yl]carbonyl}amino)tetrahydrofuran-2-carboxylic acid methyl ester, 3-[(isopropylsulfonyl)methyl]-N-(5-methyl-1,3,4-oxadiazol-2-yl)-5-(trifluoromethyl)-1,2,4-triazolo[4,3-a]pyridine-8-carboxamide, 1-{2-chloro-6-[(5-chloropyrimidin-2-yl)oxy]phenyl}-4,4,4-trifluorobutan-1-one, and 5-chloro-2-{3-chloro-2-[5-(difluoromethyl)isoxazol-3-yl]phenoxy}pyrimidine.

The composition of the present invention is suitable as water dispersible granules which are rapidly disintegrated and dispersed when added into water.

The composition of the present invention can be produced using, for example, the compound (I), the present organic solvent, the present surfactant, the solid carrier, water, and an optional formulation auxiliary ingredient. When the composition of the present invention is water dispersible granules, examples of the production method include extrusion granulation methods, rolling granulation methods, spray granulation methods, fluidized-bed granulation methods, stirring granulation methods, and coating granulation methods. It is preferable that the composition of the present invention be granular matter produced by an extrusion granulation method. Also, the composition of the present invention may be a mixed powder produced using the present organic solvent, the present surfactant, and the solid carrier.

In the following, production methods in the case of producing the composition of the present invention by the extrusion granulation method will be illustrated.

Production Method 1

S1) The compound (I), the present organic solvent, the present surfactant, and an optional formulation auxiliary ingredient are mixed to obtain a solution of the compound (I).

S2) The solid carrier and an optional formulation auxiliary ingredient are mixed to obtain a mixed powder. The mixed powder may be milled, if necessary.

S3) The mixed powder obtained in S2) and the solution obtained in S1) are mixed to obtain a mixture. In this respect, it is preferable to mix 5 to 30 wt % of the solution with the mixed powder.

S4) To the obtained mixture, optional water is added and kneaded to obtain a kneaded product. An optional antifoaming agent and/or colorant, etc. can be dissolved or dispersed in the water. Alternatively, instead of adding the present surfactant in S1), a portion of the present surfactant may be added to the water.

S5) The obtained kneaded product is extruded through a screen having holes with a predetermined diameter to obtain granulated materials.

S6) The obtained granulated materials are crushed into a predetermined length, and drying and particle size regulation are performed to obtain the composition of the present invention.

Production Method 2

S1) The compound (I), the present organic solvent, the present surfactant and an optional formulation auxiliary ingredient are mixed to obtain a solution of the compound (I).

S2) The solid carrier and an optional formulation auxiliary ingredient are mixed to obtain a mixed powder. The mixed powder may be milled, if necessary.

S3) To the mixed powder obtained in S2), optional water is added and kneaded to obtain a kneaded product. An optional antifoaming agent and/or colorant, etc. can be dissolved or dispersed in the water. Alternatively, instead of adding the present surfactant in S1), a portion of the present surfactant may be added to the water.

S4) The obtained kneaded product is extruded through a screen having holes with a predetermined diameter to obtain granulated materials.

S5) The obtained granulated materials are crushed into a predetermined length, and drying and particle size regulation are performed to obtain a solid composition.

S6) The obtained solid composition and the solution obtained in S1) are mixed to obtain the composition of the present invention.

In the following, a production method for the composition of the present invention which is a mixed powder produced using the present organic solvent, the present surfactant, and the solid carrier will be illustrated.

S1) The compound (I), the present organic solvent, the present surfactant, and an optional formulation auxiliary ingredient are mixed to obtain a solution of the compound (I).

S2) The solid carrier and an optional formulation auxiliary ingredient are mixed to obtain a mixed powder. The mixed powder may be milled, if necessary.

S3) The mixed powder obtained in S2) and the solution obtained in S1) are mixed to obtain the composition of the present invention.

The shape of the composition of the present invention may be a powdery shape or may be a granular shape. When the shape of the composition of the present invention is a granular shape, the particle size of the composition of the present invention may be usually 95% or more in terms of the proportion of granules that pass through a sieve having a mesh size of 1700 μm and do not pass through a sieve having a mesh size of 300 μm, or 95% or more in terms of the proportion of granules that pass through a sieve having a mesh size of 1400 μm and do not pass through a sieve having a mesh size of 500 μm.

The composition of the present invention can be used in crop lands such as dry fields, orchard fields, pastures, lawn fields, and forestry fields; and non-crop lands such as levee slopes, riverbeds, shoulders and slopes of the roads, railroads, parks and green spaces, playgrounds, automobile parks, airports, and industrial plant sites such as factories and storage facilities as well as idle fields and urban deserts, thereby controlling weeds.

The composition of the present invention is usually mixed with water so as to attain the desired application concentration, and thereby prepared into a spray liquid. Users apply the spray liquid from a knapsack sprayer, a spray tank, a spray plane, or an irrigation system. The amount of spray differs depending on climate conditions, the timing of treatment, soil conditions, target crops, target weeds, etc. and usually 10 L or more and 2000 L or less, preferably 50 L or more and 400 L or less, of the spray liquid per hectare are applied. Also, the spray liquid is prepared by mixing the composition of the present invention with water in usually from 2 to 10000 times, preferably from 10 to 8000 times, more preferably from 15 to 6000 times the volume of the composition.

In applying the spray liquid, it may be mixed with an adjuvant. Although the type of the adjuvant is not particularly limited, it is desirable to mix an oil-based adjuvant (a mineral oil such as a paraffinic hydrocarbon, a naphthenic hydrocarbon, or an aromatic hydrocarbon, or a methylated seed oil in which a vegetable oil (soybean oil or rapeseed oil) is esterified) such as Agri-Dex or MSO at 0.25%, 0.5%, 1%, 2%, 3%, 4%, 5% or 6% (volume/volume) into the spray liquid, or a nonionic adjuvant (polyoxyalkylene alkyl ether, polyoxyalkylene fatty acid ester, alkylaryl alkoxylate, or alkylaryl polyoxyalkylene glycol) such as Induce at 0.05%, 0.1%, 0.25%, or 0.5% (volume/volume) into the spray liquid. Other examples thereof include anionic adjuvant (substituted sulfonates) such as Gramin S, cationic adjuvant (polyoxyethyleneamine) such as Genamin T 200BM, and organic silicone-based adjuvant such as Silwet L77. Furthermore, a drift control agent such as Intact (polyethylene glycol) or a volatilization-reducing agent such as Vapex, a VaporGrip Xtra Agent (mixture of potassium hydroxide and acetic acid) may be mixed. The pH or hardness of the spray liquid is not particularly limited.

EXAMPLES

In the following, the present invention will be described in further detail with reference to Examples and Comparative Examples, etc. The scope of the present invention is not limited to these Examples.

Comparative Production Example 1

2.0 parts by weight of the compound (I), 10.0 parts by weight of SAN X P202 (calcium ligninsulfonate, manufactured by Nippon Paper Industries Co., Ltd.), 2.0 parts by weight of Sipernat 22S (amorphous silica, manufactured by Evonik Industries AG), parts by weight of Bentonite Hodaka (bentonite, manufactured by HOJUN Co., Ltd.), and 56.0 parts by weight of ASP-400P (clay, manufactured by BASF) were added, and milled and mixed using a centrifugal milling machine (ultracentrifugal milling machine ZM200, manufactured by Retsch) to obtain a composition (hereinafter, called "comparative composition 1").

Production Example 1

2.0 parts by weight of the compound (I), 20.0 parts by weight of Hallcomid M8-10 (N,N-dimethyl fatty acid amide, manufactured by Stepan), and 10.0 parts by weight of Emulsogen EL-360 (castor oil ethoxylate, manufactured by Clariant) were mixed and dissolved to obtain a solution (1). Subsequently, the solution (1) was added to a mixture (1) of 2.0 parts by weight of Sipernat 22S (amorphous silica, manufactured by Evonik Industries AG), 30.0 parts by weight of Bentonite Hodaka (bentonite, manufactured by HOJUN Co., Ltd.), and 36.0 parts by weight of ASP-400P (clay, manufactured by BASF) mixed, and mixed until homogeneous to obtain a composition (hereinafter, called "present composition 1").

Production Example 2

1.5 parts by weight of the compound (I), 20.0 parts by weight of Hallcomid M8-10 (N,N-dimethyl fatty acid amide, manufactured by Stepan), and 10.0 parts by weight of Emulsogen EL-360 (castor oil ethoxylate, manufactured by Clariant) were mixed and dissolved to obtain a solution (2). Subsequently, the solution (2) was added to a mixture (2) of 40.0 parts by weight of talc (manufactured by Neoraito Kosan Co., Ltd.) and 28.5 parts by weight of Bentonite Hodaka (bentonite, manufactured by HOJUN Co., Ltd.) mixed, and mixed until homogeneous to obtain a composition (hereinafter, called "present composition 2").

Production Example 3

1.5 parts by weight of the compound (I), 10.0 parts by weight of Hallcomid M8-10 (N,N-dimethyl fatty acid amide, manufactured by Stepan), and 10.0 parts by weight of Emulsogen EL-360 (castor oil ethoxylate, manufactured by Clariant) were mixed and dissolved to obtain a solution (3). Subsequently, the solution (3) was added to 78.5 parts by weight of talc (manufactured by Neoraito Kosan Co., Ltd.), and mixed until homogeneous to obtain a composition (hereinafter, called "present composition 3").

Production Example 4

A composition (hereinafter, called "present composition 4") was obtained in the same manner as in Production Example 2 except that the solution (2) obtained in Production Example 2 was added to 68.5 parts by weight of Bentonite Hodaka (bentonite, manufactured by HOJUN Co., Ltd.).

Production Example 5

A composition (hereinafter, called "present composition 5") was obtained in the same manner as in Production Example 2 except that the solution (2) obtained in Production Example 2 was added to 68.5 parts by weight of Radiolite F (diatomaceous earth, manufactured by Showa Chemical Industry Co., Ltd.).

Production Example 6

A composition (hereinafter, called "present composition 6") was obtained in the same manner as in Production Example 3 except that the solution (3) obtained in Production Example 3 was added to 78.5 parts by weight of ASP-400P (clay, manufactured by BASF).

Production Example 7

A composition (hereinafter, called "present composition 7") was obtained in the same manner as in Production Example 3 except that the solution (3) obtained in Production Example 3 was added to 78.5 parts by weight of SYA-21R (mica, manufactured by Yamaguchi Mica Co., Ltd.).

Production Example 8

1.5 parts by weight of the compound (I), 5.0 parts by weight of Hallcomid M8-10 (N,N-dimethyl fatty acid amide, manufactured by Stepan), and 10.0 parts by weight of Emulsogen EL-360 (castor oil ethoxylate, manufactured by Clariant) were mixed and dissolved to obtain a solution (4). Subsequently, the solution (4) was added to 83.5 parts by weight of Nitto Tancal NN #200 (calcium carbonate, manufactured by Nitto Funka Kogyo K.K.), and mixed until homogeneous to obtain a composition (hereinafter, called "present composition 8").

Production Example 9

1.5 parts by weight of the compound (I), 20.0 parts by weight of Jeffsol AG-1700 (butyl benzoate, manufactured by Huntsman), and 10.0 parts by weight of Emulsogen TS-200 (polyoxyethylene tristyryl phenyl ether, manufactured by Clariant) were mixed and dissolved to obtain a solution (5). Subsequently, the solution (5) was added to the mixture (2) obtained by the same procedures as in Production Example 2, and mixed until homogeneous to obtain a composition (hereinafter, called "present composition 9").

Production Example 10

1.5 parts by weight of the compound (I), 20.0 parts by weight of Jeffsol AG-1705 (benzyl acetate, manufactured by Huntsman), and 10.0 parts by weight of Emulsogen TS-290 (polyoxyethylene tristyryl phenyl ether, manufactured by Clariant) were mixed and dissolved to obtain a solution (6). Subsequently, the solution (6) was added to the mixture (2) obtained by the same procedures as in Production Example 2, and mixed until homogeneous to obtain a composition (hereinafter, called "present composition 10").

Production Example 11

1.5 parts by weight of the compound (I), 20.0 parts by weight of Rhodiasolv IRIS (dimethyl 2-methylglutarate, manufactured by Solvay), and 10.0 parts by weight of Emulsogen EL-360 (castor oil ethoxylate, manufactured by Clariant) were mixed and dissolved to obtain a solution (7). Subsequently, the solution (7) was added to the mixture (2) obtained by the same procedures as in Production Example 2, and mixed until homogeneous to obtain a composition (hereinafter, called "present composition 11").

Production Example 12

1.5 parts by weight of the compound (I), 20.0 parts by weight of tributyl acetylcitrate (manufactured by FUJIFILM Wako Pure Chemical Corp.), and 10.0 parts by weight of Emulsogen TS-100 (polyoxyethylene tristyryl phenyl ether, manufactured by Clariant) were mixed and dissolved to obtain a solution (8). Subsequently, the solution (8) was added to the mixture (2) obtained by the same procedures as in Production Example 2, and mixed until homogeneous to obtain a composition (hereinafter, called "present composition 12").

Production Example 13

1.5 parts by weight of the compound (I), 20.0 parts by weight of VINYCIZER 40 (diisobutyl adipate, manufactured by Kao Chemical Corp.), and 10.0 parts by weight of Emulsogen TS-200 (polyoxyethylene tristyryl phenyl ether, manufactured by Clariant) were mixed and dissolved to obtain a solution (9). Subsequently, the solution (9) was added to the mixture (2) obtained by the same procedures as in Production Example 2, and mixed until homogeneous to obtain a composition (hereinafter, called "present composition 13").

Production Example 14

1.5 parts by weight of the compound (I), 20.0 parts by weight of Solvesso 200ND (aromatic hydrocarbons, manufactured by Exxon Mobil), and 10.0 parts by weight of Stepflow 26F (EO/PO block copolymer, manufactured by Stepan) were mixed and dissolved to obtain a solution (10). Subsequently, the solution (10) was added to the mixture (2) obtained by the same procedures as in Production Example 2, and mixed until homogeneous to obtain a composition (hereinafter, called "present composition 14").

Test Example: Measurement of Suspension Rate

To a 50 mL glass beaker, 40 mL of water of 30° C. (hardness: 342 ppm) was added, and 0.5 g of each composition was gently added and uniformly dispersed by stirring. To a 250 mL measuring cylinder with a cap, 200 mL of the water described above was added, and further, the dispersion was gently added. The inside of the beaker was washed with 10 mL of the water described above, and the whole amount was transferred to the measuring cylinder. The measuring cylinder was capped, and the operation of inverting the measuring cylinder 180° in 1 second and putting it back in place in 1 second was repetitively performed 30 times. Subsequently, the measuring cylinder was left standing in a constant-temperature water tank of 30° C. for 30 minutes. From the upper portion of the measuring cylinder thus left standing, 225 mL of the dispersion was removed by aspiration. A content "b" of the compound (I) contained in remaining 25 mL of the dispersion was analyzed by high-performance liquid chromatography (HPLC), and the suspension rate was calculated according to the expression (i) given below. The results are shown in Table 1.

$$\text{Suspension rate } [\%]=[(a-b)/a]\times 111 \qquad (i)$$

wherein

"a" represents the weight of the compound (I) added to the measuring cylinder, and "b" represents the weight of the compound (I) contained in remaining 25 mL of the dispersion.

TABLE 1

| | Composition | Organic solvent | Solid carrier | Suspension rate [%] |
|---|---|---|---|---|
| Comparative Example 1 | Comparative composition 1 | — | Bentonite, clay, amorphous silica | 70.0 |
| Example 1 | Present composition 1 | Aliphatic amide | Bentonite, clay, amorphous silica | 96.7 |
| Example 2 | Present composition 2 | Aliphatic amide | Talc, bentonite | 93.4 |
| Example 3 | Present composition 3 | Aliphatic amide | Talc | 97.2 |
| Example 4 | Present composition 4 | Aliphatic amide | Bentonite | 84.1 |
| Example 5 | Present composition 5 | Aliphatic amide | Diatomaceous earth | 98.5 |
| Example 6 | Present composition 6 | Aliphatic amide | Clay | 98.7 |
| Example 7 | Present composition 7 | Aliphatic amide | Mica | 97.7 |
| Example 8 | Present composition 8 | Aliphatic amide | Calcium carbonate | 98.6 |
| Example 9 | Present composition 9 | Butyl benzoate | Talc, bentonite | 86.3 |
| Example 10 | Present composition 10 | Benzyl acetate | Talc, bentonite | 89.9 |
| Example 11 | Present composition 11 | Dimethyl 2-methylglutarate | Talc, bentonite | 83.0 |
| Example 12 | Present composition 12 | Tributyl acetylcitrate | Talc, bentonite | 86.5 |
| Example 13 | Present composition 13 | Diisobutyl adipate | Talc, bentonite | 84.9 |
| Example 14 | Present composition 14 | Aromatic hydrocarbon | Talc, bentonite | 89.6 |

Test Example 2

The weeds (Palmer amaranth (*Amaranthus palmeri*), narrow leaf amaranthus (*Amaranthus graecizanus*), common ragweed (*Ambrosia artemisiaefolia*), giant ragweed (*Ambrosia trifida*), marestail (*Conyza canadensis*), common lambsquarters (*Chenopodium album*), kochia (*Kochia scoparia), common barnyardgrass (*Echinochloa crus-galli*), and giant foxtail (*Setaria faberi*)) are seeded to a plastic pot containing soil. On the same day, the surface of soil is treated with a mixture of any one of present compositions 1 to 14, Agri-Dex (mixture of heavy paraffin oil, polyhydric alcohol fatty acid ester, and a polyethoxylate derivative, manufactured by Helena Chemical, specific gravity: 0.88), Intact (mixture of polyethylene glycol, choline chloride, and guar gum, manufactured by Precision Laboratories, specific gravity: 1.06), Vapex, a VaporGrip Xtra Agent (mixture of potassium hydroxide and acetic acid, manufactured by Kalo, specific gravity: 1.27), XtendiMAX Herbicide with VaporGrip Technology (dicamba diglycolamine salt, manufactured by Bayer, specific gravity: 1.2), and water. Their respective amounts in the treatment are 20 g/ha (in terms of the compound (I)) of the present composition, 1232 g/ha of Agri-Dex, 742 g/ha of Intact, 1858 g/ha of Vapex, a VaporGrip Xtra Agent, and 1931 g/ha of XtendiMAX Herbicide with VaporGrip Technology, and the amount of the spray liquid is 140 L/ha. Then, they are cultivated in a greenhouse. Seven days later, soybean is seeded. Fourteen days later, a weed control effect and a crop injury to the soybean are investigated. In the case of using any of the formulations, an excellent weed control effect is confirmed.

Test Example 3

The weeds (Palmer amaranth (*Amaranthus palmeri*), narrow leaf amaranthus (*Amaranthus graecizanus*), common ragweed (*Ambrosia artemisiaefolia*), giant ragweed (*Ambrosia trifida*), marestail (*Conyza canadensis*), common lambsquarters (*Chenopodium album*), kochia (*Kochia scoparia*), common barnyardgrass (*Echinochloa crus-galli*), and giant foxtail (*Setaria faberi*)) are seeded to a plastic pot containing soil. On the same day, the surface of soil is treated with a mixture of any one of present compositions 1 to 14, Agri-Dex (mixture of heavy paraffin oil, polyhydric alcohol fatty acid ester, and a polyethoxylate derivative, manufactured by Helena Chemical, specific gravity: 0.88), Intact (mixture of polyethylene glycol, choline chloride, and guar gum, manufactured by Precision Laboratories, specific gravity: 1.06), Vapex, a VaporGrip Xtra Agent (mixture of potassium hydroxide and acetic acid, manufactured by Kalo, specific gravity: 1.27), XtendiMAX Herbicide with VaporGrip Technology (dicamba diglycolamine salt, manufactured by Bayer, specific gravity: 1.2), and water. Their respective amounts in the treatment are 20 g/ha (in terms of the compound (I)) of the present composition, 1232 g/ha of Agri-Dex, 742 g/ha of Intact, 389 g/ha of Vapex, a VaporGrip Xtra Agent, and 1931 g/ha of XtendiMAX Herbicide with VaporGrip Technology, and the amount of the spray liquid is 140 L/ha. Then, they are cultivated in a greenhouse. Seven days later, soybean is seeded. Fourteen days later, a weed control effect and a crop injury to the soybean are investigated. In the case of using any of the formulations, an excellent weed control effect is confirmed.

The invention claimed is:

1. A solid pesticidal composition comprising a compound represented by the following formula (I), an organic solvent, a surfactant, and a solid carrier, wherein the organic solvent is a solvent capable of dissolving at least 1 g of the compound represented by the following formula (I) per 100 g of the organic solvent at a temperature of 0° C., and an amount of the surfactant dissolved in 100 g of the organic solvent at a temperature of 25° C. is at least 1 g:

(I)

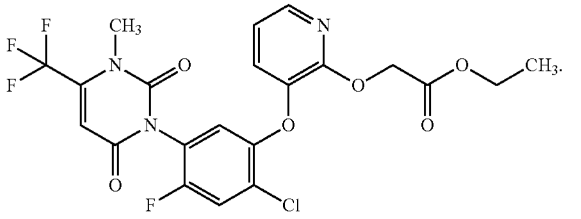

2. The solid pesticidal composition according to claim 1, wherein a content of the compound represented by the formula (I) is from 0.01 wt % to 15 wt %, a content of the organic solvent is from 1 wt % to 40 wt %, and a content of the surfactant is from 1 wt % to 20 wt %.

3. The solid pesticidal composition according to claim 1, wherein the compound represented by the formula (I) is dissolved in the organic solvent.

4. The solid pesticidal composition according to claim 1, wherein the organic solvent comprises at least one solvent selected from the group (A) consisting of butyl benzoate, benzyl acetate, dimethyl 2-methylglutarate, tributyl acetylcitrate, diisobutyl adipate, aromatic hydrocarbons, and N,N-dimethyl fatty acid amides.

5. The solid pesticidal composition according to claim 1, wherein the solid carrier comprises at least one carrier selected from the following group (B) consisting of diatomaceous earth, mica, talc, clay, calcium carbonate, bentonite, amorphous silica, crystalline cellulose, and lactose.

6. The solid pesticidal composition according to claim 2, wherein the compound represented by the formula (I) is dissolved in the organic solvent.

7. The solid pesticidal composition according to claim 1, wherein the solid carrier comprises at least one mineral substance.

8. The solid pesticidal composition according to claim 1, wherein a shape of the solid pesticidal composition is a powdery shape or a granular shape.

9. The solid pesticidal composition according to claim 1, wherein the surfactant is dissolved in the organic solvent.

10. The solid pesticidal composition according to claim 1, wherein a content of the solid carrier in the solid pesticidal composition is from 20 wt % to 90 wt %.

11. The solid pesticidal composition according to claim 1, wherein a content of the solid carrier in the solid pesticidal composition is from 50 wt % to 80 wt %.

12. The solid pesticidal composition according to claim 1, wherein, in the solid pesticidal composition:

a content of the compound represented by the formula (I) is from 0.01 wt % to 15 wt %, a content of the organic solvent is from 1 wt % to 40 wt %, a content of the surfactant is from 1 wt % to 20 wt %, a content of the solid carrier is from 50 wt % to 90 wt %, the solid carrier comprises at least one carrier selected from the group consisting of diatomaceous earth, mica, talc, clay, calcium carbonate, bentonite, and amorphous silica, and a shape of the solid pesticidal composition is a powdery shape or a granular shape.

* * * * *